United States Patent
Samuel et al.

(10) Patent No.: US 8,985,242 B2
(45) Date of Patent: Mar. 24, 2015

(54) METHOD AND SYSTEM OF PLANNING AND/OR DRILLING WELLBORES

(75) Inventors: Robello Samuel, Houston, TX (US); Olivier R. Germain, Houston, TX (US); Umesh N. Reddy, Houston, TX (US); R. Daniel Colvin, Dripping Springs, TX (US); Ramakrishna R. Chada, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 53 days.

(21) Appl. No.: 13/883,902

(22) PCT Filed: Jan. 13, 2012

(86) PCT No.: PCT/US2012/021210
§ 371 (c)(1),
(2), (4) Date: May 7, 2013

(87) PCT Pub. No.: WO2013/105969
PCT Pub. Date: Jul. 18, 2013

(65) Prior Publication Data
US 2014/0231072 A1    Aug. 21, 2014

(51) Int. Cl.
*E21B 47/00* (2012.01)
*E21B 47/08* (2012.01)
*E21B 43/30* (2006.01)
*E21B 41/00* (2006.01)

(52) U.S. Cl.
CPC ............... *E21B 47/08* (2013.01); *E21B 43/30* (2013.01); *E21B 41/0092* (2013.01)
USPC ...................... 175/40; 702/6; 703/2

(58) Field of Classification Search
USPC ................ 175/40, 57; 702/6; 703/2
See application file for complete search history.

(56) References Cited

U.S. PATENT DOCUMENTS

| | | | |
|---|---|---|---|
| 5,901,795 A | 5/1999 | Tsao et al. | |
| 7,599,797 B2 | 10/2009 | Poedjono et al. | |
| 7,814,989 B2 | 10/2010 | Nikolakis-Mouchas et al. | |
| 7,878,268 B2* | 2/2011 | Chapman et al. | 175/57 |
| 7,886,844 B2 | 2/2011 | Phillips | |
| 8,684,107 B2* | 4/2014 | Clark | 175/24 |
| 2009/0152005 A1 | 6/2009 | Chapman et al. | |
| 2010/0169018 A1 | 7/2010 | Brooks | |
| 2013/0341093 A1* | 12/2013 | Jardine et al. | 175/40 |

FOREIGN PATENT DOCUMENTS

| | | |
|---|---|---|
| WO | WO9635859 | 11/1996 |
| WO | 2013/015958 A2 | 1/2013 |

OTHER PUBLICATIONS

International Search Report and Written Opinion issued Sep. 14, 2012 in International Patent Application No. PCT/US2012/021210, filed Jan. 13, 2012.

\* cited by examiner

*Primary Examiner* — William P Neuder

(57) ABSTRACT

Planning and/or drilling wellbores. At least some of the various embodiments are methods including: receiving data indicative of position of a first wellbore; reading data indicative of position of an offset wellbore; reading data indicative of a fracture diameter for the offset wellbore; calculating a first positional uncertainty of the first wellbore; calculating a second positional uncertainly of the offset wellbore taking into account the data indicative of position and the data indicative of fracture diameter; and generating a value indicative of proximity of the positional uncertainties.

24 Claims, 8 Drawing Sheets

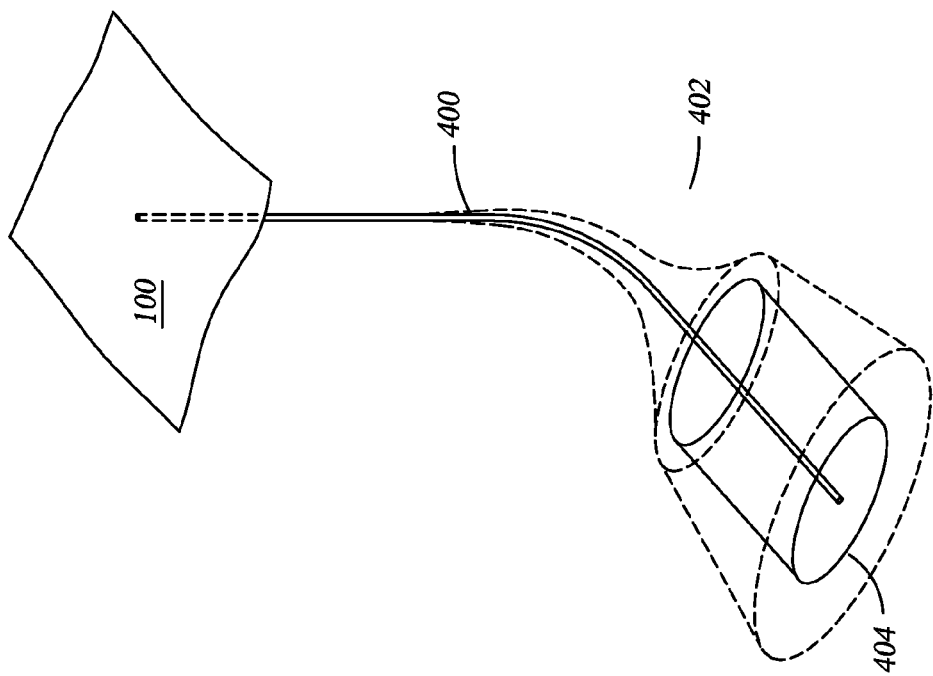
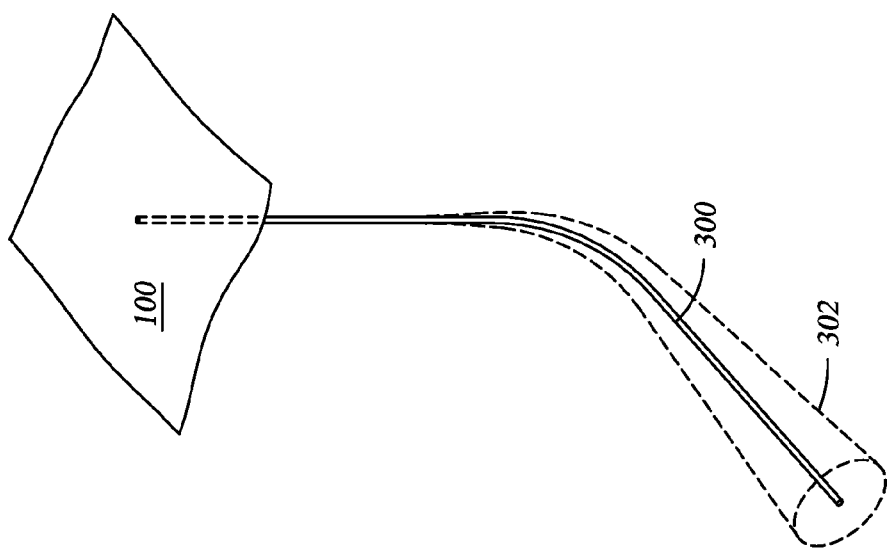

US 8,985,242 B2

METHOD AND SYSTEM OF PLANNING AND/OR DRILLING WELLBORES

CROSS-REFERENCE TO RELATED APPLICATIONS

None

BACKGROUND

Early hydrocarbon production occurred mostly from "non-source" reservoirs. That is, most hydrocarbon production has been from porous underground formations which trapped hydrocarbons that migrated from other locations. Because of the porosity of the formations in which hydrocarbons accumulate, the primary goal of drilling was merely to locate a wellbore at a suitable location within the porous underground formation. To the extent the reservoir engineer or driller considered other wellbores during the planning and/or drilling stages, the consideration was only that two wellbores not collide or intersect each other.

A large portion of more recent hydrocarbon production comes from "source" reservoirs, sometimes referred to as shale reservoirs or just shales. Shales are considered source reservoirs because the shales are the physical location where organic material was converted to hydrocarbons in the distant past based on high pressure and high heat. As the conversion from organic material to hydrocarbons took place, expansion occurred which thus forced much of the oil and gas produced to migrate to other "non-source" reservoir locations. However, shales still contain significant residual quantities of hydrocarbons.

Unlike porous non-source reservoirs, however, shales have very low permeability. That is, though there may be significant porosity per unit volume of shale, the ability of hydrocarbons to move through the pore spaces has become limited over time. Based in part on the low permeability of shales, the number of wellbores drilled into a particular shale formation may be greater to achieve adequate drainage than would be required for a highly permeable "non-source" reservoir.

BRIEF DESCRIPTION OF THE DRAWINGS

For a detailed description of exemplary embodiments of the invention, reference will now be made to the accompanying drawings in which:

FIG. 3 shows a perspective view of wellbore and including an uncertainty surface in accordance with at least some embodiments;

FIG. 4 shows a perspective view of a wellbore and including an uncertainty surface taking into account a fracture diameter, and in accordance with at least some embodiments;

NOTATION AND NOMENCLATURE

Figure 1:
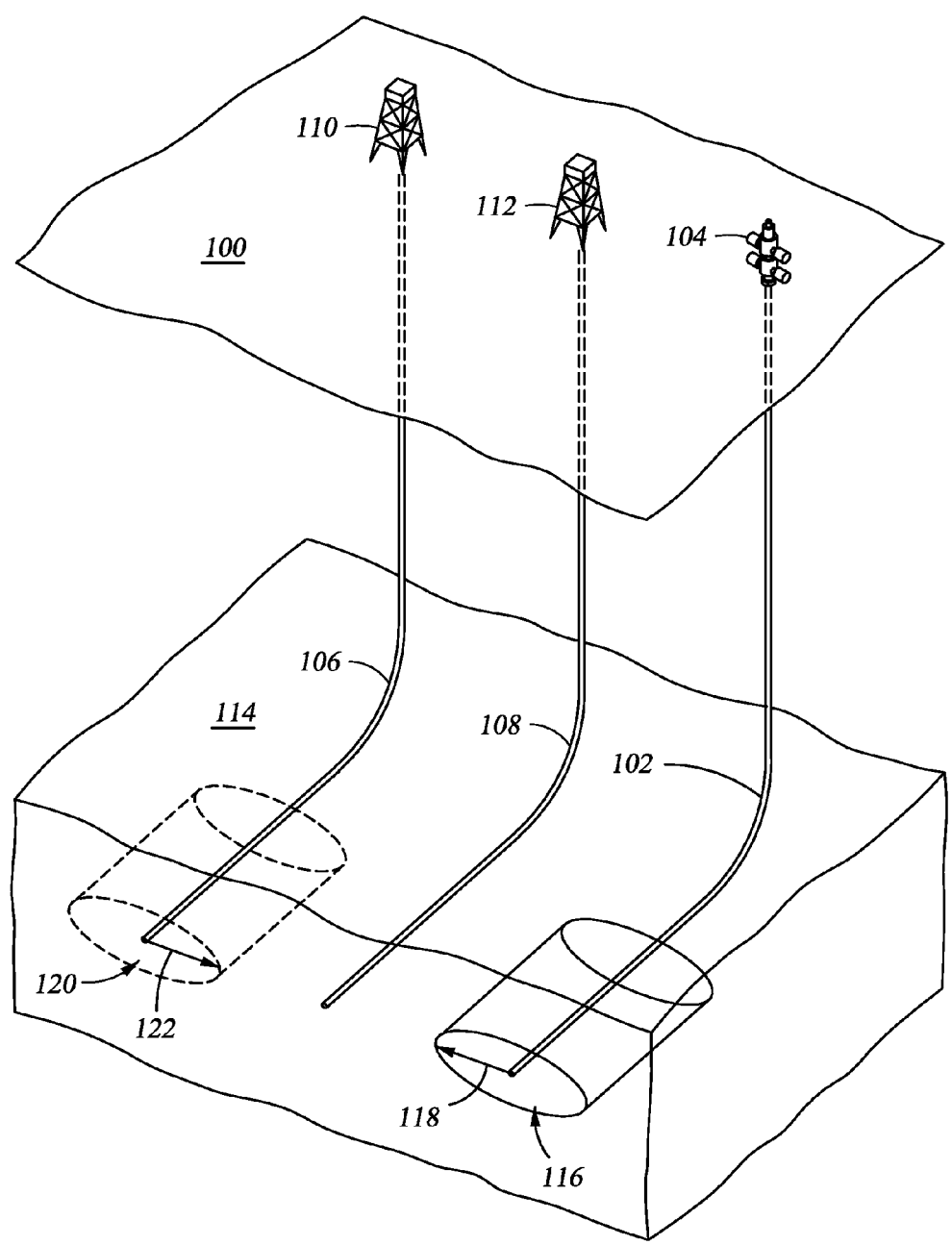
FIG. 1 shows a perspective view of a hydrocarbon producing field in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Fracture diameter" shall mean actual or expected distance fractures created by hydraulic fracturing extend from a wellbore. Use of the term "fracture diameter" shall not be read to require that the fractures created during hydraulic fracturing extend uniformly in all directions, as in many cases fractures progress a greater distance along the bedding plane than perpendicular to the bedding plane.

"Real time", in relation to an action taken with respect to drilling a wellbore, shall mean that an action takes place within two hours of a trigger event, and that the action is performed faster than could be performed by a human using only pencil and paper.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Wellbore spacing in shales is significantly more dense that wellbore spacing in non-source formations. Moreover, in order to produce hydrocarbons in commercial quantities from shales, portions if not all of the shale formation through which each wellbore extends are hydraulically fractured. The fractures created during hydraulic fracturing extend a certain distance away from the wellbore, where the distance is based on many factors (e.g., the brittleness of the shale, the pressure used during the hydraulic fracturing, and the amount of time the pressure is applied to the shale).

Various embodiments may be used for planning trajectories of wellbores and/or drilling wellbores which take into account not only the actual or planned trajectories of surrounding wellbores, but also uncertainties in position of wellbores and other parameters (e.g., fracture diameters of nearby wellbores), all to reduce the chances of direct collision of two wellbores (Le., wellbore-to-wellbore) or indirect collision.

Indirect collision may be, for example, by a first wellbore being drilled through the fracture diameter of second wellbore, a hydraulic fracture of a first wellbore extending to a second wellbore, or even the hydraulic fracturing of a first wellbore extending to the hydraulic fracture of second wellbore.

The various embodiments were developed in the context of shale formations and avoiding direct and/or indirect collisions considering fracture diameters, and thus will be described in that context; however, the various embodiment are also applicable to planning and/or steering wellbores to take into account any underground parameter (e.g., planning and/or steering to achieve desired wellbore temperature, planning and/or steering to achieve a desired wellbore storage volume, planning and/or steering based on pressure response of the formation through which the wellbore is drilled, planning and/or steering to avoid faults). The specification first turns to an example system, and then to various considerations associated with planning and drilling of wellbores.

FIG. 1 is a perspective cut-away view of at least a portion of a hydrocarbon field. In particular, FIG. 1 shows the Earth's surface 100, and in this illustrative case three wellbores drilled from the Earth's surface 100. The portion of each wellbore obscured by the Earth's surface shown in dashed lines. Wellbore 102 is associated with a valve stack 104 at the surface, and is representative of a wellbore that has been previous drilled and completed. Wellbores 106 and 108 are associated with derricks 110 and 112, respectively, and the wellbores 106 and 108 are representative of wellbores being drilled and/or completed. Each of the wellbores 102, 106, and 108 are drilled into a formation 114, such as a shale formation, but the various embodiments are not limited to use only with respect to shale formations. The overburden between the formation 114 and the Earth's surface 100 is not shown so as not to unduly complicate the figure.

Illustrative wellbore 102 has an associated fracture diameter 116 that extends a certain radial distance 118 from wellbore. While in some cases fractures may extend equally in all directions from a wellbore, as illustrated with respect to wellbore 102 in many cases the fractures may extend a greater distance in one direction (as illustrated horizontally) than in a perpendicular direction (again as illustrated, vertically).

Consider, for purposes of discussion, that drilling of wellbore 106 has concluded, but hydraulic fracturing has yet to take place. However, wellbore 106 may be associated with a planned fracture diameter 122 (shown in dashed lines) to be completed contemporaneously with the drilling of wellbore 108. Much like the actual distance 118 that fracture diameter 116 extends from wellbore 102, the planned fracture diameter 120 may have an expected radial distance 122 that the fractures of the fractures diameter 120 are expected to extend.

In accordance with at least some embodiments, in the planning stages of illustrative wellbore 108, the planned trajectory may take into account the actual trajectory of nearby wells (sometimes referred to offset wells), such as completed wells (e.g., wellbore 102) and other wellbores in various stages of creation (e.g., wellbore 106). Moreover, in addition to taking into account the trajectory of nearby offset wells, the planning may also take into account other parameters associated with the offset wells, such as actual fracture diameter (e.g., fracture diameter 116), planned fracture diameters (e.g., fracture diameter 120), and positional uncertainties associated with each offset wellbore (discussed more below).

In yet still other embodiments, during the drilling of illustrative wellbore 108, the trajectory may be changed and/or corrected to take into account the actual trajectory of offset wells, as well other parameters associated with the offset wells, such as actual fracture diameter, planned fracture diameter, and positional uncertainty associated with each offset wellbore. The specification now turns to an example system used during drilling of the illustrative wellbores, such as used during the drilling of wellbore 108.

Figure 2:
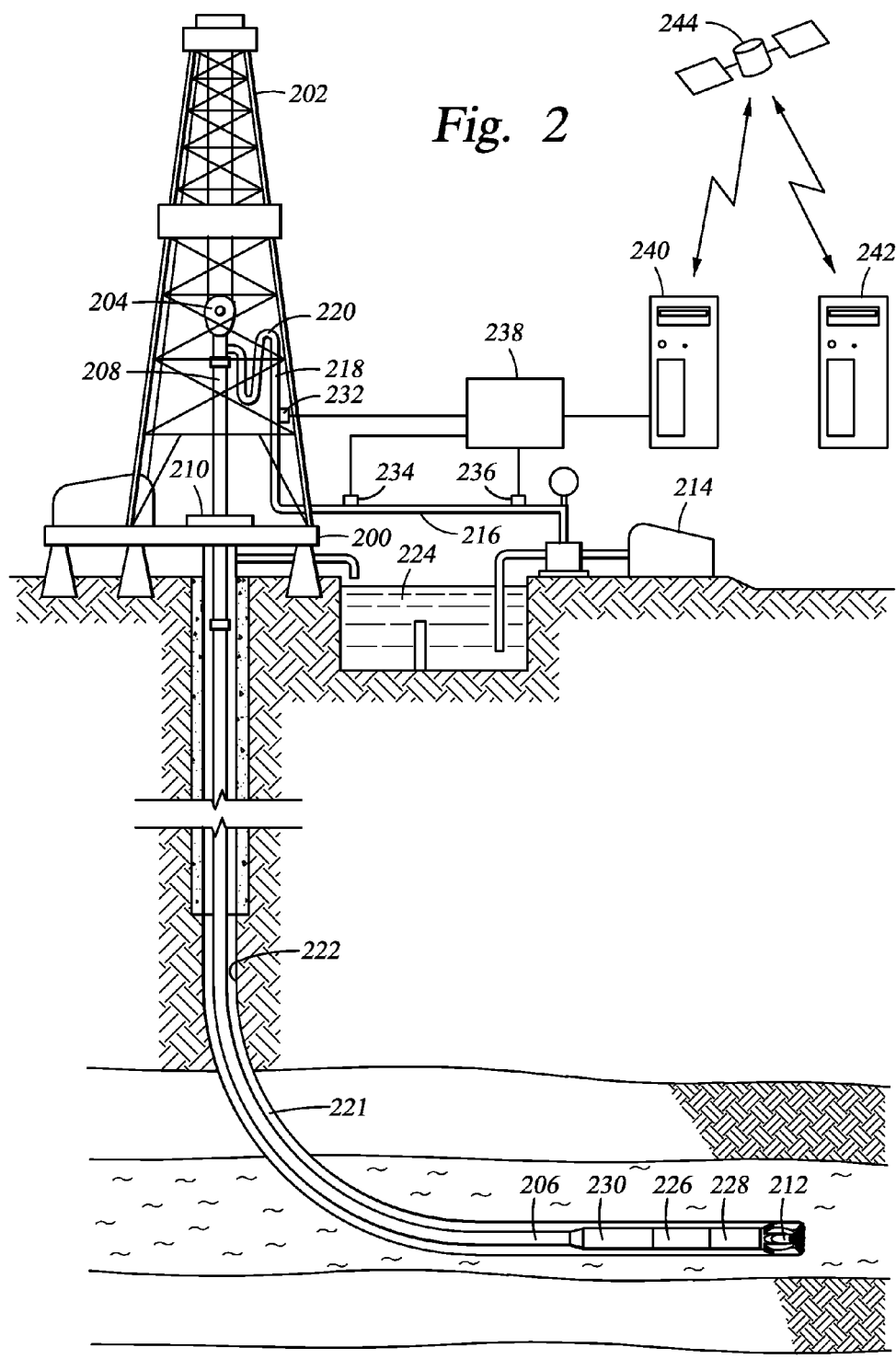
FIG. 2 shows a drilling system in accordance with at least some embodiments.

FIG. 2 shows a drilling operation in accordance with at least some embodiments. In particular, FIG. 2 shows a drilling platform 200 equipped with a derrick 202 that supports a hoist 204. Drilling in accordance with some embodiments is carried out by a string of drill pipes connected together by "tool" joints so as to form a drill string 206. The hoist 204 suspends a top drive 208 that is used to rotate the drill string 206 and to lower the drill string through the wellhead 210. Connected to the lower end of the drill string 206 is a drill bit 212. The drill bit 212 is rotated and drilling accomplished by rotating the drill string 206, by use of a downhole "mud" motor near the drill bit 212 that turns the drill bit, or by both methods. Drilling fluid is pumped by mud pump 214 through flow line 216, stand pipe 218, goose neck 220, top drive 208, and down through the drill string 206 at high pressures and volumes to emerge through nozzles or jets in the drill bit 212. The drilling fluid then travels back up the wellbore via the annulus 221 formed between the exterior of the drill string 206 and the wellbore wall 222, through a blowout preventer (not specifically shown), and into a mud pit 224 on the surface. On the surface, the drilling fluid is cleaned and then circulated again by mud pump 214. The drilling fluid is used to cool the drill bit 212, to carry cuttings from the base of the borehole to the surface, and to balance the hydrostatic pressure in the rock formations.

In accordance with the various embodiments, the drill string 206 may comprise a logging-while-drilling ("LWD") tool 226 and a measuring-while-drilling ("MWD") tool 228. The distinction between LWD and MWD is sometimes blurred in the industry, but for purposes of this specification and claims, LWD tools measure properties of the surrounding formation (e.g., porosity, permeability), and MWD tools measure properties associated with the borehole (e.g., inclination, and direction). The tools 226 and 228 may be coupled to a telemetry module 230 that transmits data to the surface. In some embodiments, the telemetry module 230 sends data to the surface electromagnetically. In other cases, the telemetry module 230 sends data to the surface by way of electrical or optical conductors embedded in the pipes that make up the drill string 206. In yet still other cases, the telemetry module 230 modulates a resistance to drilling fluid flow within the drill string to generate pressure pulses that propagate at the speed of sound of the drilling fluid to the surface.

Still referring to FIG. 2, in the illustrative case of data encoded in pressure pulses that propagate to the surface, one or more transducers, such as transducers 232, 234 and/or 236, convert the pressure signal into electrical signals for a signal digitizer 238 (e.g., an analog to digital converter). While three transducers 232, 234 and/or 236 are illustrated, a greater number of transducers, or fewer transducers, may be used in particular situations. The digitizer 238 supplies a digital form of the pressure signals to a computer 240 or some other form of a data processing device. Computer 240 operates in accordance with software (which may be stored on a computer-readable storage medium) to process and decode the received signals.

In accordance with at least some embodiments, at least a portion of the telemetry data sent to the surface by the telemetry module 230 is positional data collected by the MWD tool 228. The telemetry data may be further analyzed and processed by computer 240 to directly make, or to assist a driller in making, changes and/or corrections to the drilling direction. More particularly, using the positional data, the computer system 240 may update or estimate the path of the wellbore being created, may analyze the path in relation to data regarding one or more offset wells, and then provide an indication of course change for the wellbore to avoid directly or indirectly colliding with an offset well.

In yet still other example embodiments, the surface computer 240 may gather positional data from the MWD tool 228, and then forward data to another computer system 242, such as a computer system at the home office of the oilfield services provider. Using the positional data, the computer system 242 may update or estimate the path of the wellbore being created, may analyze the path in relation to data regarding one or more offset wells, and then provide an indication of course change for the wellbore to avoid directly or indirectly colliding with an offset well, the indication of course change provided to the computer system 240. The communication of data between computer system 240 and computer system 242 may take any suitable form, such as over the Internet, by way of a local or wide area network, or as illustrated over a satellite 244 link. The specification now turns to positional uncertainties.

In many cases a wellbore may be 5,000 feet or more below the Earth's surface at its deepest point, and extend 10,000 to 15,000 feet horizontally away from the location of the wellhead at the Earth's surface. While there have been many advances in calculating and/or determining the position of the wellbore, uncertainty still exists regarding the precise location in three-dimensional space of wellbore. In some cases, the uncertainly may increase with increasing length of a wellbore. FIG. 3 shows a perspective view of a wellbore 300 that extends from the Earth's surface 100 into an underground formation. The underground formation is not shown in FIG. 3 so as not to unduly complicate the figure, and the portion of the wellbore 300 obscured by the surface 100 is shown in dashed lines. As the distance of the wellbore increases from the wellhead, the positional uncertainty increases. In particular, FIG. 3 illustrates positional uncertainty by way of an uncertainty surface 302 depicted in dashed lines. The uncertainty surface 302 expands with increasing length of the wellbore 300. The positional uncertainty is present not only for completed wellbores, but also for wellbores being drilled. Moreover, the uncertainty also exists with respect to length of the wellbore, and thus the uncertainly surface 302 in the case of FIG. 3 may actual take a "teardrop" shape around the distal end of the wellbore, but the "teardrop" shape is not shown so as not to unduly complicate the figure. Thus, when drilling in accordance with at least some embodiments, the positional uncertainty of a wellbore being drilled, and also the positional uncertainty of offset wellbores, is considered to ensure that two wellbores do not intersect or collide.

FIG. 4 shows a perspective view of a wellbore 400 that extends from the Earth's surface 100 into an underground formation. The underground formation is not shown in FIG. 4 so as not to unduly complicate the figure, and the portion of the wellbore 400 obscured by the Earth's surface 100 is shown in dashed lines. As with respect to wellbore 300 of FIG. 3, as the distance of the wellbore 400 increases from the wellhead, the positional uncertainty increases, and the positional uncertainly of wellbore 400 is illustrated by way of an uncertainty surface 402 depicted in dashed lines. However, for purposes of this discussion consider that a hydraulic fracturing has taken place on the distal end of wellbore 100, thus resulting in a fracture diameter 404. The uncertainty surface 402 expands with increasing distance of the wellbore 400, and also encompasses the fracture diameter 404. Thus, when drilling in accordance with at least some embodiments, the positional uncertainty of a wellbore being drilled, and also the positional uncertainty of offset wellbores including the positional uncertainty of the fracture diameters, is considered to ensure that two wellbores do not intersect or collide.

Figure 5:
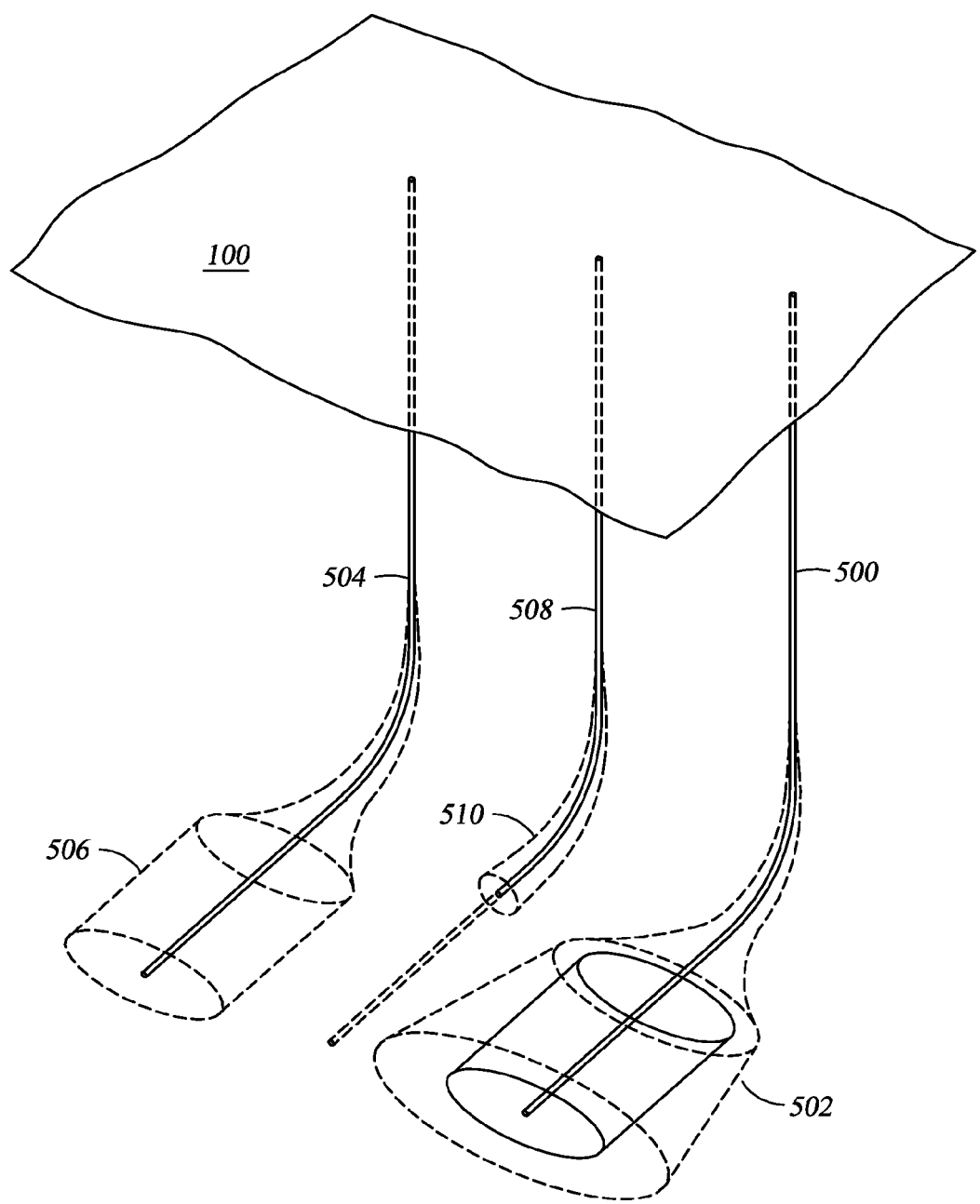
FIG. 5 shows a drilling situation in accordance with at least some embodiments.

FIG. 5 is a perspective view of various wellbores extending from the Earth's surface 100 into an underground formation. The underground formation is not shown in FIG. 5 so as not to unduly complicate the figure, and the portion of the wellbores obscured by the Earth's surface 100 shown in dashed lines. In particular, in FIG. 5 wellbore 500 has been completed and hydraulically fractured, and is thus associated with an uncertainty surface 502. Wellbore 504 is being drilled, and is expected to be hydraulically fractured, and thus has an uncertainty surface 506. Wellbore 508 is likewise being drilled, has an uncertainly surface 510 and expected path 512 (shown in dashed lines). Thus, as wellbore 508 is being drilled, the illustrative systems monitor not only the position of the wellbore 508 (e.g., by way of MWD tool 228), but also other data such as: relative position and positional uncertainly of the offset wellbore; position and positional uncertainty of the offset wellbore 504; and expected fracture diameter for the offset wellbore 504, along with associated uncertainty of the fracture diameter. In accordance with at least some embodiments, in real time with drilling the wellbore 508, the wellbore is steered (taking into account the various data) to ensure there are no direct or indirect collisions of the wellbores. Stated slightly differently, in accordance with at least some embodiments drilling course changes are implemented in real time with drilling wellbore 508 to ensure that the outer boundary of the uncertainty surface 510 does not intersect the outer boundary of the uncertainty surfaces 502 and/or 506 of the offset wellbores 500 and 504, respectively.

In yet still further embodiments, making drilling course changes for wellbore 508 may also take into account the expected fracture diameter for wellbore 508 (similar to the expected fracture diameter of wellbore 504, the expected fracture diameter indirectly indicated by the size of the uncertainty surface 506).

In accordance with at least some embodiments, a computer system executing instructions (e.g., computer system 240, or computer system 242) may not only provide indications of course changes to avoid intersecting other wellbores as discussed above, but the instructions may also create a visual representation (e.g., on a display device) of the physical relationships of the wellbores and positional uncertainty illustrated by the uncertainty surfaces. In some cases the visual representation may be a projection onto a two-dimensional screen of the three-dimensional relationships, but in other cases display devices that project in three-dimensions (with or without the help of glasses) may also be used. The visual representation may include not only a depiction of the path of each wellbore, but also a depiction of the positional uncertainty illustrated by the uncertainty surfaces.

In addition to, or in place of, providing indications of course changes, the instructions executed on one or more of the associated computer systems may also create a value indicative of proximity between a wellbore being drilling and an offset wellbore (in any state of completion). In the case of several offset wellbores in close proximity, a value indicative of proximity may be calculated for each offset wellbore. Each value indicative of proximity may be calculated in variety of ways, and example methodology for calculating the value indicative of proximity will now be discussed. For purposes of discussion, the methodologies for calculating the values indicative of proximity are logically broken into two categories: three-dimensional view methodologies; and surface projection methodologies. The three-dimensional view methodologies are discussed first.

Figure 6:
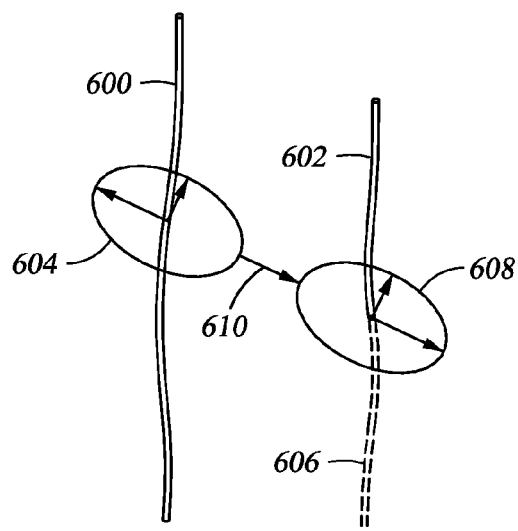
FIG. 6 shows a perspective view of the trajectories of two wellbores in accordance with at least some embodiments.

FIG. 6 shows a perspective view of two wellbores 600 and 602 having arbitrary trajectories. Wellbore 600 extends further than wellbore 602, and the horizontal slice of the uncertainly surface for wellbore 600 at the closest point between the wellbores is shown as ellipse 604. Consider for purposes of explanation that wellbore 602 is being drilled in proximity to wellbore 600, wellbore 600 has a planned trajectory 606 beyond the distal end of what has been currently drilled, and a horizontal slice of the uncertainly surface for wellbore 602 at the distal end is shown as ellipse 608.

In some embodiments, the value indicative of proximity is merely the physical distance between the ellipse 604 and the ellipse 608, as shown by vector 610. That is, the value indicative of proximity in this illustrative embodiment is the length of vector 610. In yet still other cases, the value indicative of proximity takes into account center-to-center spacing of the wellbores 600 and 602, along with a radius of each uncertainty surface (again, here shown as an ellipse in each case). More particularly, in accordance with at least some embodiments the value indicative of proximity may be calculated according to the following equation:

$$V_P = D_{cc}/(R_{w1} + R_{w2}) \qquad (1)$$

where $V_p$ is the value indicative of proximity, $D_{cc}$ is the center-to-center spacing of the two wellbores, $R_{w1}$ is a radius of the uncertainty surface of the first wellbore, and $R_{w2}$ is the radius of the uncertainly surface of the second wellbore. In some case, the center-to-center spacing is measured from the distal tip of the wellbore being drilled to the nearest portion of the offset wellbore. Moreover, in cases where the uncertainty surface has an elliptical cross-section (e.g., associated with the fracture diameter in shale formation where brittleness is directional), either the major axis of the particular elliptical cross-section may be used as the $R_w$, or the minor axis may be used as the $R_w$. That is, for calculating more conservative values indicative of proximity the major axis for each uncertainty surface may be used, and for less conservative values indicative of proximity the minor axis for each uncertainty surface may be used. In yet still other cases, the major axis of one uncertainty surface and the minor axis of the other uncertainty surface may be used.

Calculating the value indicative of proximity using illustrative equation (1) results in a numerical value, and in some cases the numerical values may be referred to as a "ranging factor". When the numerical value has value greater than one, the two wellbores are fully separated. When the numerical value is equal to one, the uncertainty surfaces may be touching (depending on how conservatively the value is calculated). Finally, when the numerical value is less than one, the uncertainty surfaces of the two wellbores may be overlapping, possibly indicating that steering corrections should be made and/or particular diligence should be exercised to avoid dangerous situations in continued drilling.

Figure 7:
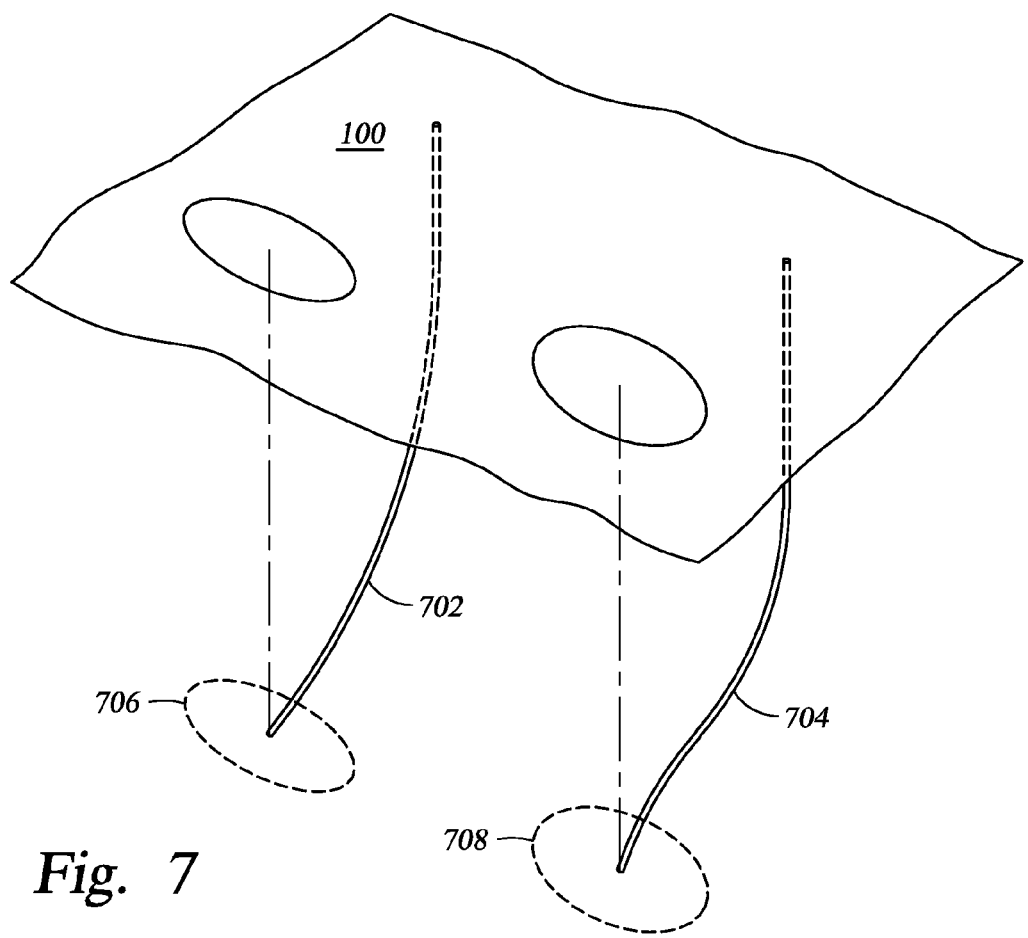
FIG. 7 shows a perspective view of a drilling situation, along with projections of the portions of an uncertainty surface for each wellbore, and in accordance with at least some embodiments.

The discussion now turns to surface projection methodologies for calculating the value indicative of proximity. FIG. 7 shows a perspective view of two wellbores 702 and 704 having arbitrary trajectories extending from the Earth's surface 100. Again, portions of the wellbores 702 and 704 obscured by Earth's surface are shown in dashed lines. The distal tip of each wellbore 702 and 704 has an associated positional uncertainty, and in FIG. 7 the positional uncertainty is illustratively shown in the form of circles 706 and 708, respectively. For projection methodologies used to calculate the value indicative of proximity, computer instructions executed by any suitable computer system project the positional uncertainty at a point on the first wellbore 702 (e.g., at the distal tip of the wellbore) to a horizontal surface above or below the actual position of the point on the first wellbore 702. Likewise, the computer instructions project the positional uncertainty at a point on the second wellbore 704 (e.g., at the distal tip of the wellbore) to the horizontal surface above or below the actual position of the point on the second wellbore 704. Any suitable horizontal surface may be used, and as illustrated in FIG. 7 the projection may be to the Earth's surface 100. Because of the deviated angles of the wellbores 702 and 704, the projections at the surface may take different forms than at the respective positions below the Earth's surface. For example, in the illustrative case of FIG. 7 where the uncertainty surfaces are circular in a plane perpendicular to the wellbore at the distal tip, the projections becomes elliptical at the Earth's surface.

Figure 8:
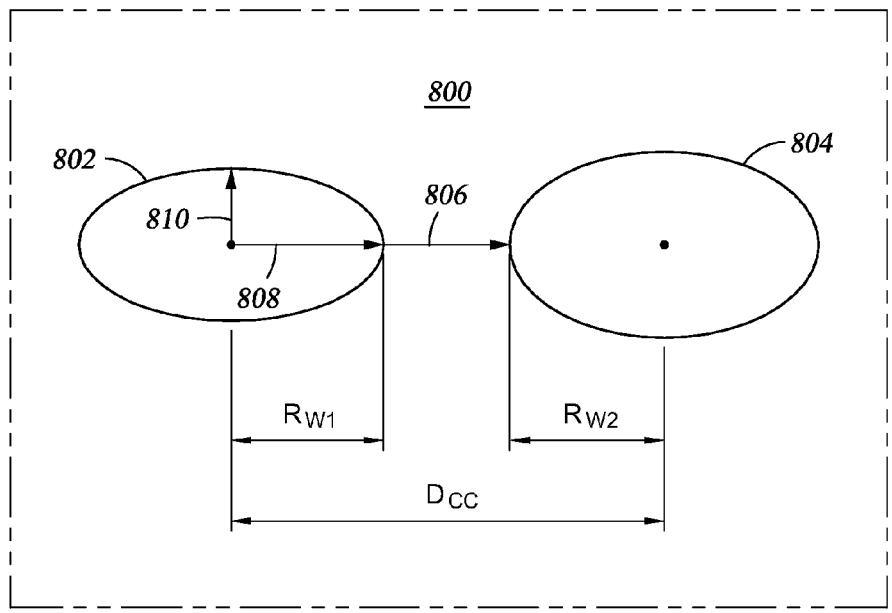
FIG. 8 shows an overhead view of a surface to which projections have been made in accordance with at least some embodiments.

Calculating the value indicative of proximity in these example situations may then be based on the projections. FIG. 8 shows an overhead view of a horizontal plane 800 into which the uncertainty circles 706 and 708 have been projected. In particular, projection 802 in the form of an ellipse corresponds to uncertainty circle 706, and projection 804 in the form of an ellipse corresponds to uncertainty circle 708. In some embodiments, the value indicative of proximity is merely the physical distance between the outer boundary of the projection 802 and the outer boundary of the projection 804, as shown by vector 806 (the vector 806 residing within the plane 800). That is, the value indicative of proximity in this illustrative embodiment is the length of vector 806.

In yet still other cases, the value indicative of proximity takes into account center-to-center spacing of the projections 802 and 804, along with a radius of each projection (again, here shown as an ellipse in each case). More particularly, in accordance with at least some embodiments the value indicative of proximity may be calculated according to the following equation:

$$V_P = D_{cc}/(R_{P1} + R_{P2}) \qquad (2)$$

where $V_P$ is the value indicative of proximity, $D_{cc}$ is the center-to-center spacing of the two projections, $R_{P1}$ is a radius of the first projection, and $R_{P2}$ is a radius of the second projection. In cases where the projections are elliptical, either the major axis of the projection may be used as the $R_P$, or the minor axis may be used as the $R_P$. For example, for projection 802 either the major axis 808 may be used, or the minor axis 810 may be used. Stated otherwise, for calculating more conservative values indicative of proximity the major axis for each projection may be used, and for less conservative values indicative of proximity the minor axis for each projection may be used. In yet still other cases, the major axis of one projection and the minor axis of the other projection may be used.

Calculating the value indicative of proximity using illustrative equation (2) results in a numeral value, and again in some cases the numerical values may be referred to as a "ranging factor". When the numerical value has value greater than one, the two wellbores are fully separated. When the numerical value is equal to one, the uncertainty surfaces may be touching (depending on how conservatively the value is calculated). Finally, when the numerical value is less than one, the uncertainty surfaces of the two wellbores may be overlapping, possibly indicating that steering corrections should be made and/or particular diligence should be exercised to avoid dangerous situations in continued drilling.

Figures 9, 10:
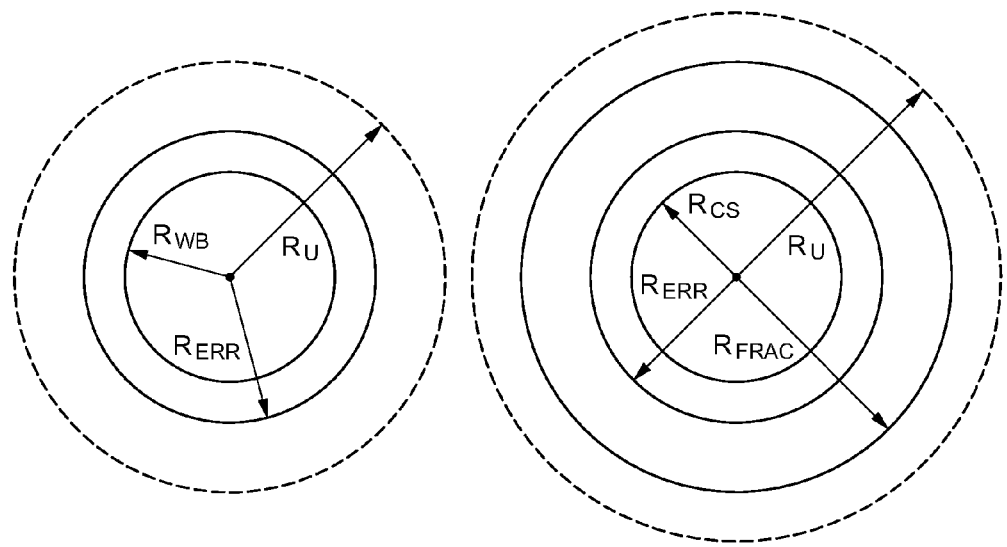
FIG. 9 visually shows an error radius determination in accordance with at least some embodiments.
FIG. 10 visually shows an error radius determination in accordance with at least some embodiments.

The size of the uncertainty surfaces may be calculated in any suitable way. For example, in embodiments where a wellbore is being drilled (and where fracture diameter is not yet a consideration), the radius of the uncertainty surface at any particular location is a combination of the radius the wellbore, and the radius error, as shown in FIG. 9. In particular, the radius of the uncertainty surface may be calculated according to the following equation:

$$R_u = R_{WB} + R_{ERR} \quad (3)$$

Where $R_u$ is the radius of the uncertainty surface at the particular location, $R_{WB}$ is the radius of the wellbore at the particular location, and $R_{ERR}$ is the radius of the error at the particular location.

In other cases, for example cases where a wellbore has been cased, perforated and fractured, the radius of the uncertainty surface may be a combination of the casing radius, the error radius and the fracture diameter, as shown in FIG. 10. In particular, the radius of the uncertainty surface in such situations may be calculated according to the following equation:

$$R_u = R_{cs} + R_{ERR} + R_{FRAC} \quad (4)$$

where $R_u$ is the radius of the uncertainty surface at the particular location, $R_{cs}$ is the radius of the wellbore at the particular location, $R_{ERR}$ is the radius of the error at the particular location, and $R_{FRAC}$ is the fracture diameter at the particular location. Other mechanisms for calculating the radius of the uncertainty surface may be equivalently used. Moreover, different mechanisms regarding the size of the uncertainty surface for each well may be used. Stated otherwise, the same methodology for calculating a radius of an uncertainty surface as between a first well and an offset well need not be used.

Moreover, other methodologies may be used for calculating the value indicative of proximity. For example, in situations where the radius of the uncertainty surface is based on an error radius associated with the wellbore (e.g., FIG. 9) and/or the casing (e.g., FIG. 10), then in other example embodiments the value indicative of proximity may be calculated according to the following equation:

$$V_P = (D_{cc} - R_{OW})/(R_{ERR1} + R_{ERR-OW}) \quad (6)$$

where $V_P$ is the value indicative of proximity, $D_{cc}$ is the center-to-center spacing of the two wellbores, $R_{OW}$ is the radios of the offset well, $R_{ERR1}$ is the error radius for the first wellbore, and $R_{ERR-OW}$ is the error radius the offset well.

Here again, calculating the value indicative of proximity using illustrative equation (6) results in a numeral value that also may be referred to as a "ranging factor". When the numerical value has value greater than one, the two wellbores are fully separated. When the numerical value is equal to one, the uncertainty surfaces may be touching (depending on how conservatively the value is calculated). Finally, when the numerical value is less than one, the uncertainty surfaces of the two wellbores may be overlapping, possibly indicating that steering corrections should be made and/or particular diligence should be exercised to avoid dangerous situations in continued drilling.

Figure 11:
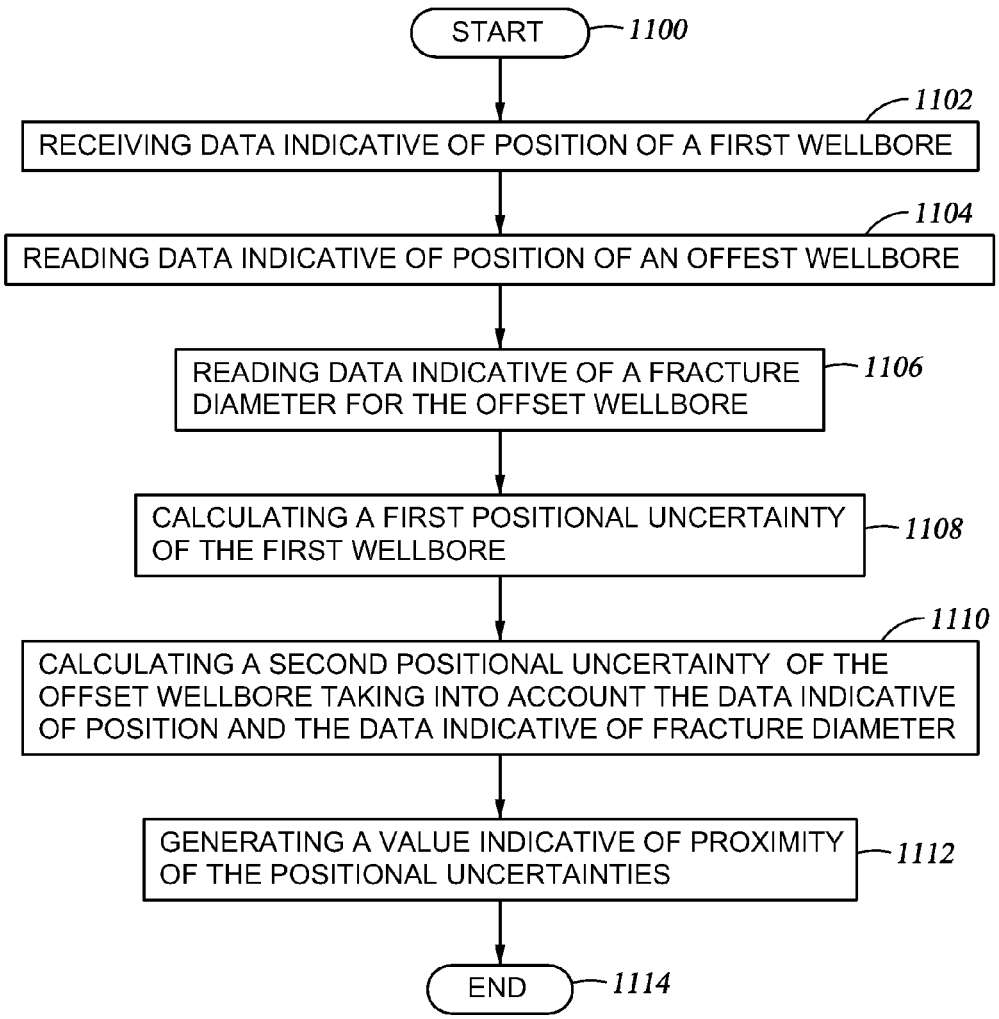
FIG. 11 shows a method in accordance with at least some embodiments.

FIG. 11 shows a method in accordance with at least some embodiments. In particular, the method starts (block 1100) and comprises: receiving data indicative of position of a first wellbore (block 1102); reading data indicative of position of an offset wellbore (block 1104); reading data indicative of a fracture diameter for the offset wellbore (block 1106); calculating a first positional uncertainty of the first wellbore (block 1108); calculating a second positional uncertainly of the offset wellbore taking into account the data indicative of position and the data indicative of fracture diameter (block 1110); and generating a value indicative of proximity of the positional uncertainties (block 1112). Thereafter the method ends (block 1114), in some cases to be immediately restarted.

Figure 12:
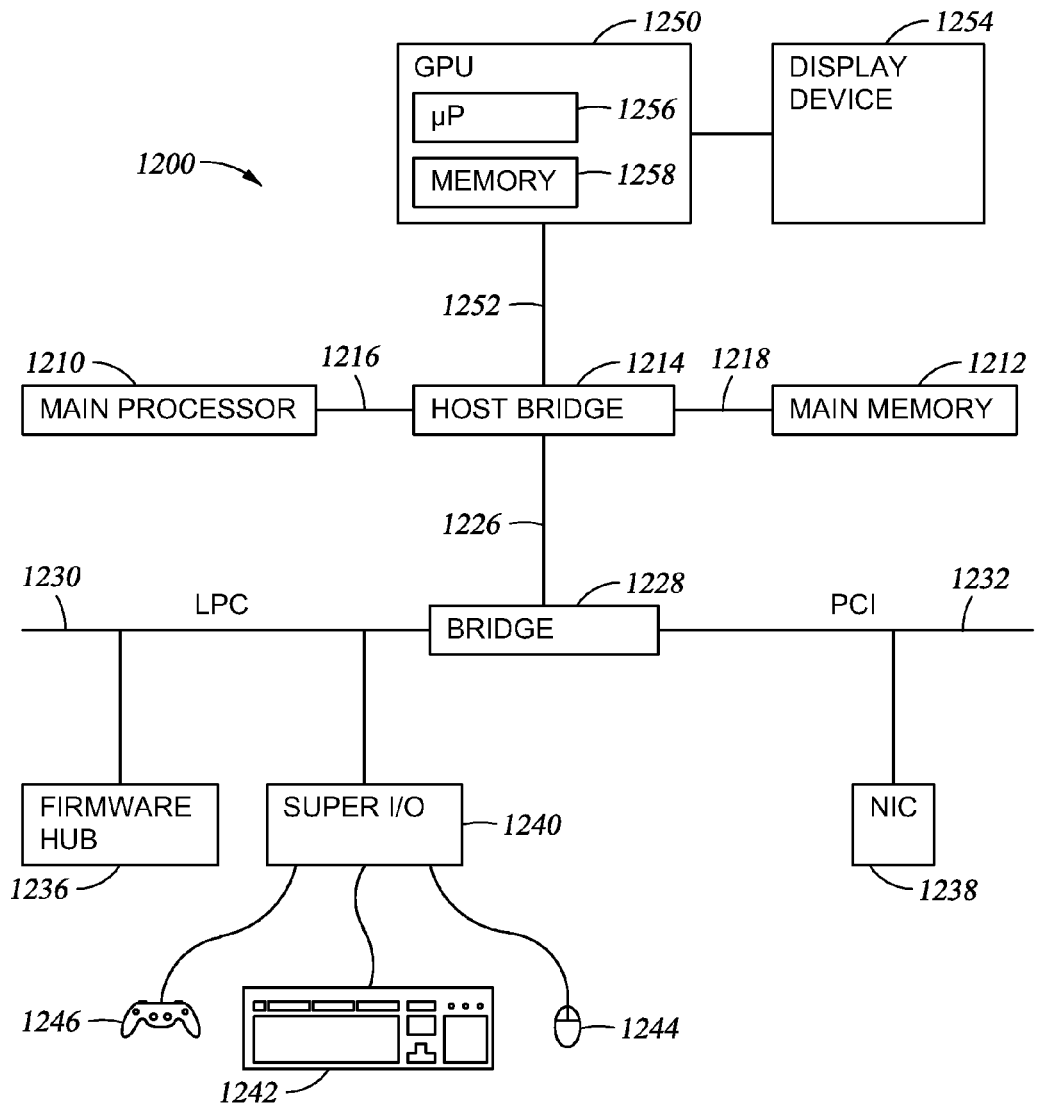
FIG. 12 shows a computer system in accordance with at least some embodiments.

FIG. 12 illustrates a computer system 1200 in accordance with at least some embodiments. Any or all of the embodiments that involve receiving data of position of wellbores, reading data fracture diameters, calculating positional uncertainty, generating values indicative of proximity, and/or providing indications of course changes for wellbores may be implemented in whole or in part on a computer system such as that shown in FIG. 12, or after-developed computer systems. In some cases, the various embodiment are implemented as a "plug-in" or add-on to existing software, such as the DECISIONSPACE ® brand products available from Landmark Graphics Corporation of Houston, Texas.

In particular, computer system 1200 comprises a main processor 1210 coupled to a main memory array 1212, and various other peripheral computer system components, through integrated host bridge 1214. The main processor 1210 may be a single processor core device, or a processor implementing multiple processor cores. Furthermore, computer system 1200 may implement multiple main processors 1210. The main processor 1210 couples to the host bridge 1214 by way of a host bus 1216, or the host bridge 1214 may be integrated into the main processor 1210. Thus, the computer system 1200 may implement other bus configurations or bus-bridges in addition to, or in place of, those shown in FIG. 12.

The main memory 1212 couples to the host bridge 1214 through a memory bus 1218. Thus, the host bridge 1214 comprises a memory control unit that controls transactions to the main memory 1212 by asserting control signals for memory accesses. In other embodiments, the main processor 1210 directly implements a memory control unit, and the main memory 1212 may couple directly to the main processor 1210. The main memory 1212 functions as the working memory for the main processor 1210 and comprises a memory device or array of memory devices in which programs, instructions and data are stored. The main memory 1212 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 1212 is an example of a non-transitory computer-readable medium storing programs and instructions, and other examples are disk drives and flash memory devices.

The illustrative computer system 1200 also comprises a second bridge 1228 that bridges the primary expansion bus 1226 to various secondary expansion buses, such as a low pin count (LPC) bus 1230 and peripheral components interconnect (PCI) bus 1232. Various other secondary expansion buses may be supported by the bridge device 1228.

Firmware hub 1236 couples to the bridge device 628 by way of the LPC bus 1230. The firmware hub 1236 comprises read-only memory (ROM) which contains software programs executable by the main processor 1210. The software programs comprise programs executed during and just after power on self test (POST) procedures as well as memory reference code. The POST procedures and memory reference code perform various functions within the computer system before control of the computer system is turned over to the operating system. The computer system 1200 further comprises a network interface card (NIC) 1238 illustratively coupled to the PCI bus 1232. The NIC 1238 acts to couple the computer system 1200 to a communication network, such the Internet, or local- or wide-area networks.

Still referring to FIG. 12, computer system 1200 may further comprise a super input/output (I/O) controller 1240 coupled to the bridge 1228 by way of the LPC bus 1230. The Super I/O controller 1240 controls many computer system functions, for example interfacing with various input and output devices such as a keyboard 1242, a pointing device 1244 (e.g., mouse), a pointing device in the form of a game controller 1246, various serial ports, floppy drives and disk drives. The super I/O controller 1240 is often referred to as "super" because of the many I/O functions it performs.

The computer system 1200 may further comprise a graphics processing unit (GPU) 1250 coupled to the host bridge 1214 by way of bus 1252, such as a PCI Express (PCI-E) bus or Advanced Graphics Processing (AGP) bus. Other bus systems, including after-developed bus systems, may be equivalently used. Moreover, the graphics processing unit 1250 may alternatively couple to the primary expansion bus 1226, or one of the secondary expansion buses (e.g., PCI bus 1232). The graphics processing unit 1250 couples to a display device 1254 which may comprise any suitable electronic display device upon which any image or text can be plotted and/or displayed (e.g., the visualizations of trajectories of the wellbores of FIGS. 1 and 3-7). The graphics processing unit 1250 may comprise an onboard processor 1256, as well as onboard memory 1258. The processor 1256 may thus perform graphics processing, as commanded by the main processor 1210. Moreover, the memory 1258 may be significant, on the order of several hundred megabytes or more. Thus, once commanded by the main processor 1210, the graphics processing unit 1250 may perform significant calculations regarding graphics to be displayed on the display device, and ultimately display such graphics, without further input or assistance of the main processor 1210.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, the various techniques discussed herein may alternatively be used for: planning and/or steering to achieve desired wellbore temperature; planning and/or steering to achieve a desired wellbore storage volume; planning and/or steering based on pressure response of the formation through which the wellbore is drilled; and planning and/or steering to avoid faults. It is intended that the following claims be interpreted to embrace all such variations and modifications.

What is claimed is:

1. A method comprising:
   receiving data indicative of position of a first wellbore, the receiving by a computer system;
   reading data indicative of position of an offset wellbore, the reading by the computer system;
   reading data indicative of a fracture diameter for the offset wellbore, the reading by the computer system;
   calculating, by the computer system, a first positional uncertainty of the first wellbore;
   calculating a second positional uncertainly of the offset wellbore taking into account the data indicative of position and the data indicative of fracture diameter; and
   generating a value indicative of proximity of the positional uncertainties.

2. The method of claim 1 wherein reading data indicative of fracture diameter further comprises reading at least one selected from the group consisting of: fracture diameter of a completed hydraulic fracture of the offset wellbore; and fracture diameter of a planned hydraulic fracture of the offset wellbore.

3. The method of claim 1:
   wherein receiving data indicative of position further comprises receiving the data indicative of position in real time with drilling of the first wellbore; and further comprising;
   providing an indication of course change for the first wellbore to avoid intersecting an outer boundary of the second positional uncertainty, the providing by the computer system in real time with drilling of the first wellbore.

4. The method of claim 3 wherein providing the indication of course change further comprises providing the indication of course change such that an expected fracture diameter of the first wellbore avoids intersecting the outer boundary of the second positional uncertainty.

5. The method of claim 1:
   wherein calculating the first positional uncertainty further comprises:
      calculating the first positional uncertainty at a point on the first wellbore below a surface of the earth; and
      projecting the first positional uncertainty to the surface and thereby creating a first uncertainty projection;
   wherein calculating the second positional uncertainty further comprises:
      calculating the second positional uncertainty at a point on the offset wellbore below the surface; and
      projecting the second positional uncertainty to the surface and thereby creating a second uncertainty projection.

6. The method of claim 5 wherein generating the value indicative of proximity further comprises dividing a center-to-center spacing of the uncertainty projections by a sum of a first radius of the first positional uncertainty and a second radius of the second positional uncertainty.

7. The method of claim 6 wherein the first radius is at least one selected from the group consisting of: a major axis radius of the first uncertainty projection; and a minor axis radius of the first uncertainty projection.

8. The method of claim 1 wherein generating the value indicative of proximity further comprises calculating a distance between an outer boundary of the first positional uncertainty and an outer boundary of the second positional uncertainty.

9. A computer system comprising:
a processor;
a memory coupled to the processor;
the memory stores instructions that, when executed by the processor, cause the processor to:
receive data indicative of position of a first wellbore;
read data indicative of position of an offset wellbore;
read data indicative of a fracture diameter for the offset wellbore;
calculating a first positional uncertainty of the first wellbore;
calculating a second positional uncertainly of the offset wellbore based on the data indicative of position and the data indicative of fracture diameter; and
generate a value indicative of proximity of the positional uncertainties.

10. The computer system of claim 9 wherein when the processor reads data indicative of fracture diameter, the instructions further cause the processor to read at least one selected from the group consisting of: fracture diameter of a completed hydraulic fracture of the offset wellbore; and fracture diameter of a planned hydraulic fracture of the offset wellbore.

11. The computer system of claim 9:
wherein when the processor receives data indicative of position, the instructions further cause the processor to receive the data indicative of position in real time with drilling of the first wellbore; and
wherein the instructions further cause the processor to provide, in real time with drilling of the first wellbore, an indication of course change for the first wellbore to avoid intersecting an outer boundary of the second positional uncertainty.

12. The computer system of claim 11 wherein when the processor provides the indication of course change the instructions cause the processor to provide the indication of course change such that an expected fracture diameter of the first wellbore avoids intersecting the outer boundary of the second positional uncertainty.

13. The computer system of claim 9:
wherein when the processor calculates the first positional uncertainty, the instructions cause the processor to:
calculate the first positional uncertainty at a point on the first wellbore below a surface of the earth; and
project the first positional uncertainty to the surface and thereby create a first uncertainty projection;
wherein when the processor calculates the second positional uncertainty, the instructions cause the processor to:
calculate the second positional uncertainty at a point on the offset wellbore below the surface; and
project the second positional uncertainty to the surface and thereby create a second uncertainty projection.

14. The computer system of claim 13 wherein when the processor generates the value indicative of proximity, the instructions cause the processor to divide a center-to-center spacing of the uncertainty projections by a sum of a first radius of the first positional uncertainty and a second radius of the second positional uncertainty.

15. The computer system of claim 14 wherein the first radius is at least one selected from the group consisting of: a major axis radius of the first uncertainty projection; and a minor axis radius of the first uncertainty projection.

16. The computer system of claim 9 wherein when the processor generates the value indicative of proximity, the instructions cause the processor to calculate a distance between an outer boundary of the first positional uncertainty and an outer boundary of the second positional uncertainty.

17. A non-transitory computer-readable medium storing instructions that, when executed by a processor, cause the processor to:
receive data indicative of position of a first wellbore;
read data indicative of position of an offset wellbore;
read data indicative of a fracture diameter for the offset wellbore;
calculate a first positional uncertainty of the first wellbore;
calculate a second positional uncertainly of the offset wellbore based on the data indicative of position and the data indicative of fracture diameter; and
generate a value indicative of proximity of the positional uncertainties.

18. The non-transitory computer-readable medium of claim 17 wherein when the processor reads data indicative of fracture diameter, the instructions further cause the processor to read at least one selected from the group consisting of: fracture diameter of a completed hydraulic fracture of the offset wellbore; and fracture diameter of a planned hydraulic fracture of the offset wellbore.

19. The non-transitory computer-readable medium of claim 17:
wherein when the processor receives data indicative of position, the instructions further cause the processor to receive the data indicative of position in real time with drilling of the first wellbore; and
wherein the instructions further cause the processor to provide, in real time with drilling of the first wellbore, an indication of course change for the first wellbore to avoid intersecting an outer boundary of the second positional uncertainty.

20. The non-transitory computer-readable medium of claim 19 wherein when the processor provides the indication of course change the instructions cause the processor to provide the indication of course change such that an expected fracture diameter of the first wellbore avoids intersecting the outer boundary of the second positional uncertainty.

21. The non-transitory computer-readable medium of claim 17:
wherein when the processor calculates the first positional uncertainty, the instructions cause the processor to:
calculate the first positional uncertainty at a point on the first wellbore below a surface of the earth; and
project the first positional uncertainty to the surface and thereby create a first uncertainty projection;
wherein when the processor calculates the second positional uncertainty, the instructions cause the processor to:
calculate the second positional uncertainty at a point on the offset wellbore below the surface; and
project the second positional uncertainty to the surface and thereby create a second uncertainty projection.

22. The non-transitory computer-readable medium of claim 21 wherein when the processor generates the value indicative of proximity, the instructions cause the processor to divide a center-to-center spacing of the uncertainty projections by the sum of a first radius of the first positional uncertainty and a second radius of the second positional uncertainty.

23. The non-transitory computer-readable medium of claim 22 wherein the first radius is at least one selected from the group consisting of: a major axis radius of the first uncertainty projection; and a minor axis radius of the first uncertainty projection.

24. The non-transitory computer-readable medium of claim 17 wherein when the processor generates the value indicative of proximity, the instructions cause the processor to calculate a distance between an outer boundary of the first positional uncertainty and an outer boundary of the second positional uncertainty.

* * * * *